Dec. 10, 1968  D. H. VAN TUYL  3,415,418
METERING DEVICE
Filed March 6, 1967  2 Sheets-Sheet 1
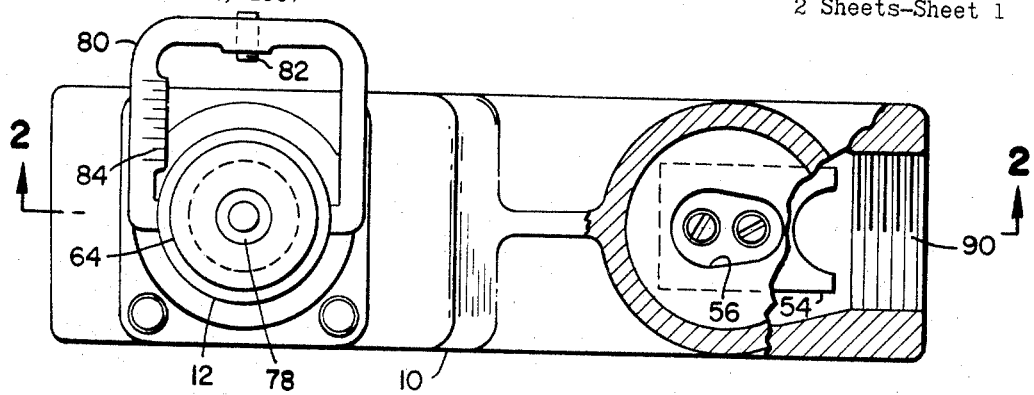
FIG_1
FIG_1A
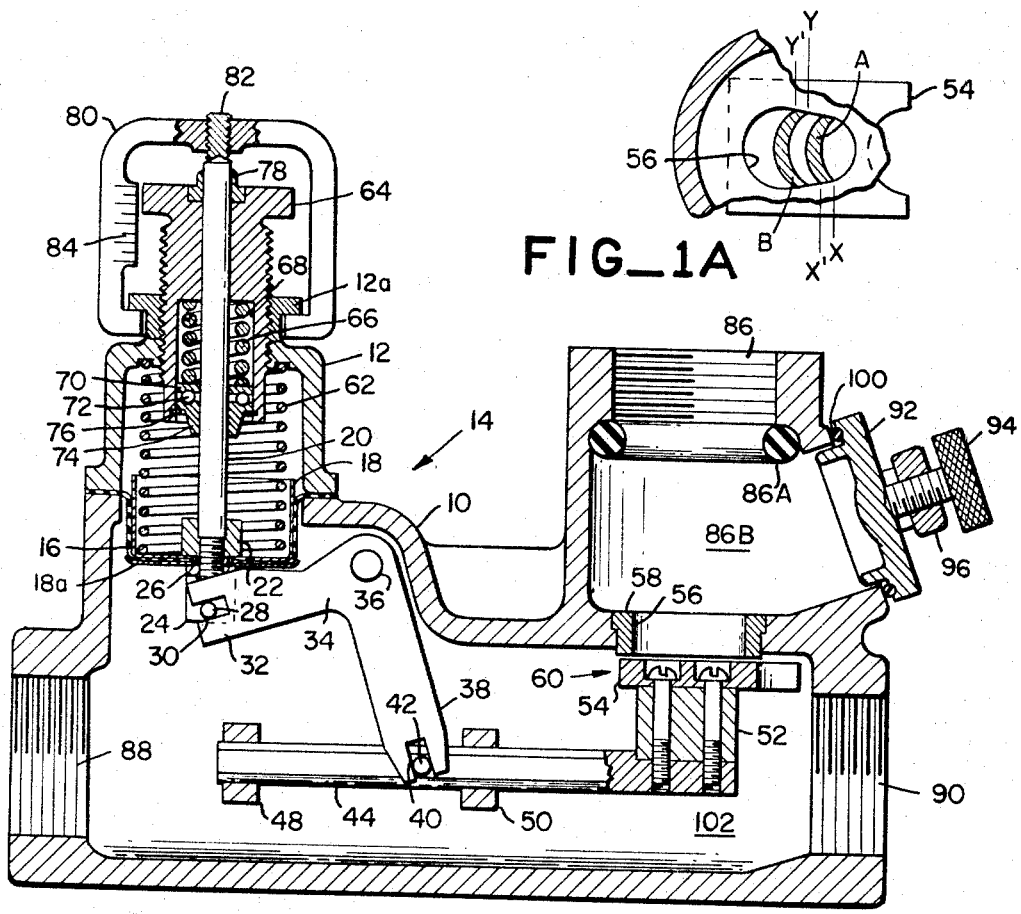
FIG_2
INVENTOR.
DAVID H. VAN TUYL
BY
Mellin, Moore & Weissenberger
ATTORNEYS

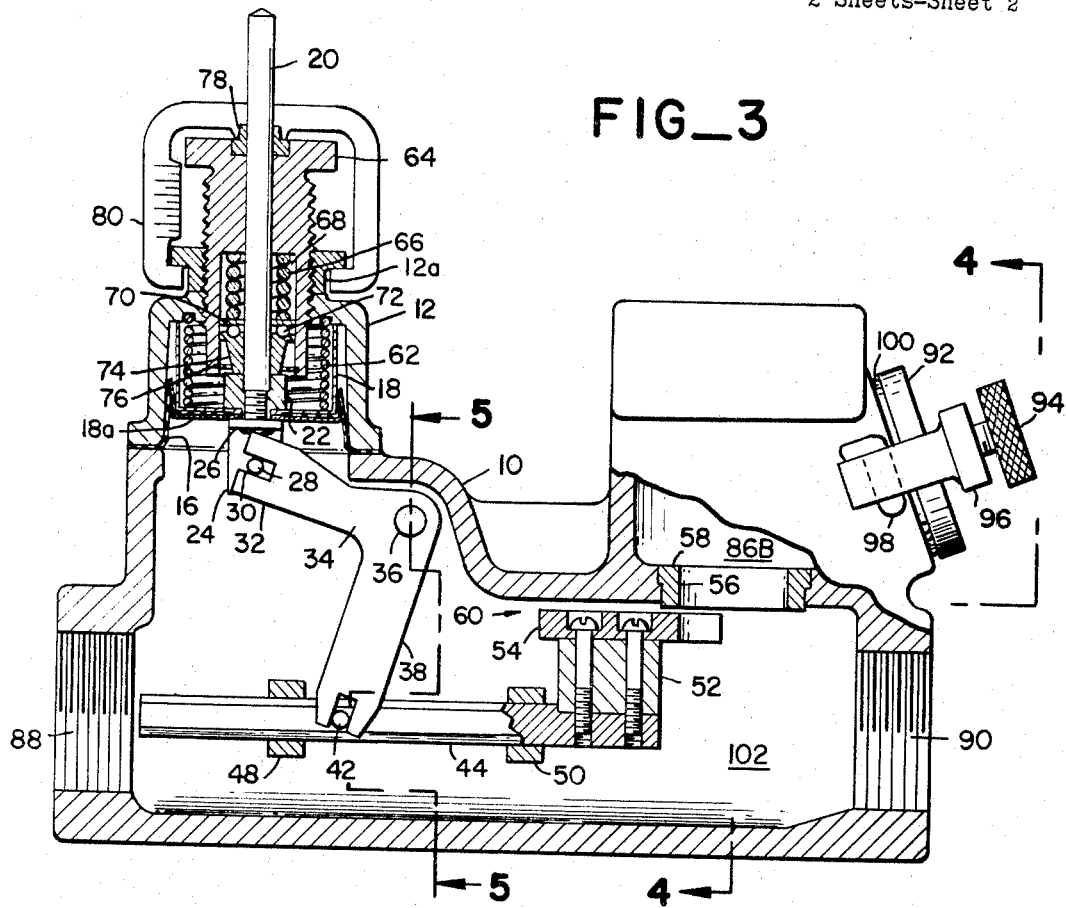
FIG_3
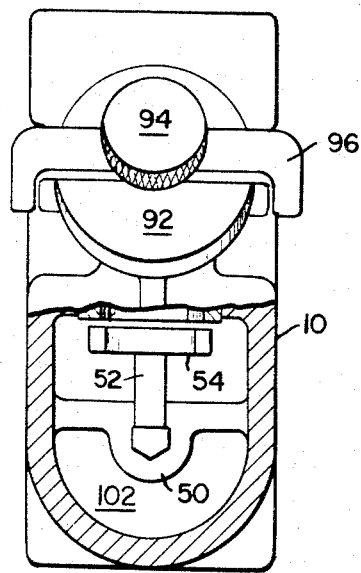
FIG_4
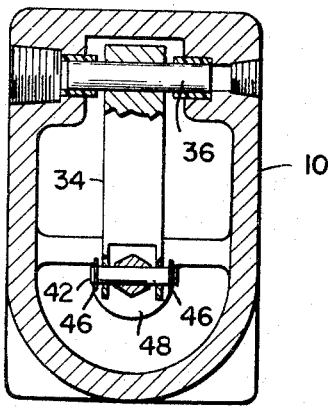
FIG_5
INVENTOR.
DAVID H. VAN TUYL
BY
Nellin, Moore & Weissenberger
ATTORNEYS

United States Patent Office 3,415,418
Patented Dec. 10, 1968

3,415,418
METERING DEVICE
David H. Van Tuyl, Palo Alto, Calif., assignor to Clemco Clementina Ltd., San Francisco, Calif., a general partnership
Filed Mar. 6, 1967, Ser. No. 620,995
9 Claims. (Cl. 222—57)

ABSTRACT OF THE DISCLOSURE

This invention relates to a device for metering granular material into a fluid stream which includes a housing and a diaphragm within the housing which is linked to a valve for introducing granular material therein so that movement of the diaphragm under fluid pressure within the housing determines the extent of opening of the valve, thereby determining the rate of flow of said granular material into the fluid stream through and from the housing so that a nozzle used in conjunction with the device secures the proper amount of granular material to operate efficiently at all fluid pressures.

Background of the invention

It is well-known to use devices which introduce granular material into a fluid stream in sandblasting and the like. In this use, the granular material acts as an abrasive which strikes against a surface to be cleaned.

These devices generally have an inlet where pressurized air is introduced, a pressurized reservoir for said granules, a valve which allows the granules to enter the air stream, and an outlet from which the air stream and granules exit, the air-and-abrasive mixture being accelerated through a nozzle and used to clean a surface. However, it is generally the case that the granules are fed into the air stream at a constant rate, regardless of the rate at which the air stream passes through the device. This results in the situation where more granules than can be used efficiently by the nozzle are introduced, or the situation where too few granules are introduced, thereby reducing overall efficiency of the device.

It would obviously be desirable for a device of this type to introduce granules in proportion to the rate of flow of the air stream, thereby resulting in maximum efficiency.

A device which allows for adjustment of the rate of introduction of granular matter into an air stream is known (Jorgensen, 1,585,549). However, this adjustment is not automatically responsive to the rate of flow of the air stream through the device, but is made manually. A self-regulating valve which controls two fluids is known (Walker et al., 3,194,438), but this device is not adaptable to the applicant's use since no abrasive is involved.

It is an object of the invention to overcome the above problems by providing a device which automatically varies the rate of introduction of granules in proportion to the rate of flow of the fluid within the device.

It is also the case that when air is initially introduced into a conventional device there is a period of time during which the air is blown into the initially unpressurized granule reservoir before balancing of the system occurs. With the ordinary type of valve, there is a flow of granules even when no air is flowing through the device. Thus, a buildup of granules occurs in the area below the valve which introduces granular material, and when the air is introduced, part of that buildup is blown along with the air into the reservoir, thus causing undesirable wear in the area of granule introduction.

It is a further object of the invention to overcome these problems by providing a device in which the valve which allows introduction of granular material into the air stream is closed when the device is depressurized, thereby insuring that no buildup of granules can occur.

Summary of the invention

Broadly stated, the apparatus for metering granular material into a pressurized fluid stream comprises a housing and means for introducing the pressurized fluid stream into the housing. Means are included for allowing the pressurized fluid stream to flow through and from the housing while maintaining fluid pressure in the housing proportional to the rate of flow of the fluid stream from the housing. A valve is adapted to introduce the granular material into the pressurized fluid stream in the housing. Means are included for urging the granular material through the valve and into the pressurized fluid stream so that the introduced granular material flows through and from the housing in the pressurized fluid stream, the rate of introduction of granular material varying with the extent of opening of the valve. Means are also included for varying the extent of opening of the valve in proportion to the fluid pressure within the housing.

Brief description of the drawings

These and other objects of the invention will become apparent from a perusal of the following specification, taken in connection with the accompanying drawings in which FIG. 1 is a plane view partially broken away of the metering device;

FIG. 1A is a detailed view of the valve showing various valve openings;

FIG. 2 is a section taken along the line 2—2 of FIG. 1 with the valve in a closed position;

FIG. 3 is a view similar to FIG. 2 but with the valve in a full open position;

FIG. 4 is a partial section taken along the line 4—4 of FIG. 3; and

FIG. 5 is a section taken along the line 5—5 of FIG. 3.

Description of the preferred embodiment

As best shown in FIGS. 1 and 2, a body 10 and a cap 12 are bolted together to form a housing 14. A diaphragm 16 is sealingly secured about its outer periphery within the housing 14 between the body 10 and cap 12, and has a piston 18 disposed against its upper surface. A clamp plate 18a is disposed against the lower surface of the diaphragm 16. The piston 18, diaphragm 16, and clamp plate 18a have substantially central apertures therethrough. A rod 20 is disposed to threadably engage with a collar 22 which bears against the upper surface of the piston 18, the threaded portion of the rod 20 extending through the aperture in the piston 18, diaphragm 16, and clamp plate 18a to threadably engage with a nut 24. The nut 24, when tightened down on rod 20, bears on a washer 26 which, in turn, bears on the underside of the clamp plate 18a. Thus, when tightening the nut 24 on the rod 20, the collar 22 and washer 26 act to squeeze the inner periphery of the diaphragm 16 between the piston 18 and clamp plate 18a to sealingly secure the diaphragm 16 therebetween.

The nut 24 has a pin 28 passing therethrough which is held therein by snap-rings in grooves (not shown) on its opposite ends. The pin 28 is adapted to engage with slots 30 formed in a yoke 32 on rocker arm 34. The rocker arm 34 pivots about pin 36 which is held in the body 10 and has second yoke 38 having slots 40 adapted to engage a pin 42. The pin 42 passes through a shaft 44 and is held therein by snap-rings 46 in grooves on its opposite ends (FIG. 5). The shaft 44 is slidably held by supports 48 and 50, which are part of the body 10, and has bolted to one end a supporting block 52 and a valving element 54, the valving element 54 being positioned to act in conjunction with an aperture 56 defined by an inset 58 in the body 10 to form a valve 60. The shaft 44 is of hexagonal cross-section, as are the openings of supports 48 and 50 through which shaft 44 slides to insure that shaft 44 cannot rotate within the supports 48 and 50. It will be seen that movement of the diaphragm 16 results in movement of the valving element 54 relative to the aperture 56, thus controlling the extent of opening of the valve 60.

A helical spring 62 is disposed between the upper surface of the piston 18 and the cap 12 to resiliently bias the diaphragm 16 in a valve-closing position.

The cap 12 has a screw 64 threadably connected into it, the screw 64 having within itself a hollow portion 66 in which is disposed a helical spring 68. The screw 64 is disposed so that the helical spring 68 is concentric with the helical spring 62. The helical spring 68 is held in compression within the screw 64 by a washer 70 which bears on ball bearings 72, which, in turn, bear on a collar 74 engaging against a snap-ring 76 held in a groove in the hollow portion 66. The collar 74, ball bearings 72 and washer 70 are all slidable within the screw 64.

The rod 20 slidably extends through the collar 74, ball bearings 72, washer 70, helical spring 68, screw 64, and a sealing element 78 in the screw 64. The rod 20 is concentric with the helical springs 62 and 68. The helical spring 68 can be moved along its axis by rotating the screw 64, thus changing the position of the helical spring 68 relative to the diaphragm 16. A lockout 12a is provided to hold the screw in a chosen position. A handle 80 is pivotally connected to the locknut 12a and has therein a setscrew 82 which is positioned and adapted to mate with the extended end of the rod 20 and limit the upward movement of the rod 20 when the handle 80 is placed in proper position. Scale means 84 are also included in the handle 80 to note the position of the screw 64 and the helical spring 68 inside the screw 64.

Aperture 86 is formed in the body 10 to allow introduction of sand or other granular material into the valve 60 from a reservoir (not shown).

Apertures 88 and 90 are included to allow inlet and outlet of a fluid stream.

A clean-out cap 92 is held over an aperture in the body 10 by a thumbscrew 94 which is threaded through a strap 96. The strap 96 slides under protrusions 98 on the body 10 (FIG. 3), and thus the turning down of the thumbscrew 94 urges the clean-out cap 92 against the body 10 and holds it in place. These parts may be removed for cleaning of the valve 60 by turning the thumbscrew 94 in a loosening direction until the strap 96 can be slid from under the protrusions 98 and removed from the body 10. The clean-out cap 92 may then be removed to allow direct access to the valve 60. An O-ring 100 may be used to assist in sealing of the clean-out cap 92 against the body 10.

In the operation of the device, means (not shown) are included for introducing a pressurized air stream (or other fluid stream) into the aperture 88. The pressurized air stream flows through the body 10 and out the aperture 90, the diaphragm 16 and linkage described above being positioned to allow the flow. The air stream is then directed against the object to be cleaned by any well-known means, such as a nozzle (not shown). This nozzle also acts to maintain air pressure within the body 10 which is proportional to the rate of flow of the air stream. The pressure within the body 10 acts upon diaphragm 16 to move it and the piston 18 upward (FIG. 3) against the resilient force of helical spring 62, provided the handle 80 is pivoted away from the rod 20 to allow it to move upward. The pin 28 moves along with the piston 18, the pin 28 in turn acting on slots 30 to pivot rocker arm 34 about pin 36. When rocker arm 34 so pivots, slots 40 act on pin 42 to move shaft 44 and hence valving element 54 in a valve-opening direction.

It is thus clear that the valve 60 will open through the above linkage to an extent proportional to the movement of the diaphragm 16.

The spring 62, as pointed out above, serves to bias the diaphragm 16 in a value-closing position. This insures that no buildup of granules from the reservoir can occur in the area 102 when there is no pressure in the device. However, spring 62 has a relatively low spring constant and little pressure on the diaphragm 16 compresses it to a point where, after a certain amount of diaphragm 16 travel, the collar 22 contacts the collar 74, bringing spring 68 into play. The spring 68 has a much higher spring constant than spring 62, and thus spring 62 in effect acts to allow an initial opening of valve 60, and thus an initial rate of introduction of granules for a given pressure within the device. This initial opening of the valve 60 can be adjusted by varying the axial position of the screw 64 (and helical spring 68), as described above, to obtain the desired rate of initial introduction of granules into the air stream for a given pressure, which is determined by the nozzle.

When the collar 22 contacts the collar 74 and any initial precompression of the spring 68 is overcome, the diaphragm 16 will continue to move upward under pressure and compress spring 68. It is clear that then lowing the pressure within the body 10 allows the diaphragm 16 to move downward to an extent under the urging of helical spring 68, thus closing the valve 60 to an extent. The diaphragm 16 moves against spring 68 to an extent proportional to the pressure within the body 10, since that air pressure is proportional to the rate of flow of the air stream through the body 10 for a given nozzle, the extent of valve 60 opening is a function of the rate of air flow through the body 10.

After the pressure is built up in the reservoir, the sand will be urged through the valve 60 and introduced into the pressurized air stream. Since the extent of opening of the valve 60 is a function of the rate of flow of the air stream, the rate of introduction of sand into the air stream is also a function of the rate of the air stream.

It is to be noted that aperture 56 is of a flared shape, as best shown in FIG. 1. The aperture 56 presents a continuously increasing aperture width to act in conjunction with the valving element 54 as the valving element 54 is moved in a valve-opening direction. This insures that the increment of valve 60 opening which is available under the full travel of the spring 68, is proportional to the extent to which the valve 60 is opened before spring 68 comes into play, i.e., the larger the selected initial opening, the greater the increase in valve opening available.

This is illustrated in FIG. 1A where various positions of valving element 54 relative to aperture 56 are shown. Position X is the initial position the valving element 54 will take for a given setting of screw 64, i.e., the extent to which the valve 60 will open before spring 68 comes into play. As spring 68 is compressed under additional pressure on the diaphragm 16, the valving element 54 travels to position X′, when it will stop, due to the fact that the device has reached an equilibrium point or the coils of spring 68 are closed. Thus, the valve 60 is additionally opened on area A. If the screw 64 is adjusted so that the spring 68 does not come into play until valving element 54 travels to position Y (the initial opening of the valve 60), an increase in pressure on the diaphragm 16 will move the valving element 54 to position Y′ where it will stop, due to the fact that the device again reaches the equilibrium point of the coils of spring 68 are closed. Thus, the valve is opened to expose area B. It will be seen that because of the gradually increasing width of the aperture 56, area B is greater than area A even though the linear travel of valving element 54 is the same in either case. Thus, the desired initial opening of valve 60 for maximum efficiency may be chosen by adjustment of the screw 64, as described above, determining an initial rate of flow of sand into the air stream, and it is insured that the increase in rate of flow of sand is proportional to the initial rate of flow, resulting in maximum efficiency regardless of the chosen initial setting.

An O-ring 86a may advantageously be included adjacent the aperture 86 above the area 86B to insure that the blowing of the sand in area 86B into the reservoir when the air stream is initially introduced, as described above, will result in very little wear on the body 10, the O-ring 86a wearing instead.

The axial position of the screw 64 and hence the initial opening allowed of valve 60 may be noted on the scale means 84 on the handle 80 when that handle 80 is pivoted into proper position, as noted above. The handle 80 may also be pivoted so that the set screw 82 limits the upward movement of the rod 20, and the set screw 82 may be adjusted to keep the valve 60 closed when the diaphragm 16 is subjected to air pressure. Thus, air may flow through the device without allowing sand to enter the air stream, if so desired.

It is thus clear that the rate of flow of sand into the air stream in the invention is proportional to the rate of flow of the air stream itself for a given nozzle, resulting in maximum efficiency of the device. Furthermore, when there is little or no air pressure within the device, the valve introducing sand into the device is closed, and no undesirable buildup of sand can occur.

It will be seen that the inventive concept described above is capable of being carried out in many different ways, of which the embodiment illustrated and described herein is merely illustrative. Consequently, I do not desire to be limited in any way by the particular details of the embodiment shown and described herein, but only by the scope of the following claims.

I claim:
1. Apparatus for metering granular material into a pressurized fluid stream comprising:
   (a) a housing;
   (b) means for introducing the pressurized fluid stream into the housing;
   (c) means for allowing the pressurized fluid stream to flow through and from the housing while maintaining fluid pressure in the housing proportional to the rate of flow of the fluid stream from the housing;
   (d) a valve adapted to introduce the granular material into the pressurized fluid stream in the housing;
   (e) means for urging the granular material through the valve and into the pressurized fluid stream so that the introduced granular material flows through and from the housing in the pressurized fluid stream, the rate of introduction of granular material varying with the extent of opening of the valve; and
   (f) means for varying the extent of opening of the valve in proportion to the fluid pressure within the housing.

2. Apparatus for metering granular material into a pressurized fluid stream comprising:
   (a) a housing;
   (b) means for introducing the pressurized fluid stream into the housing;
   (c) means for allowing the pressurized fluid stream to flow through and from the housing while maintaining fluid pressure in the housing proportional to the rate of flow of fluid stream from the housing;
   (d) a valve adapted to introduce granular material into the pressurized fluid stream in the housing;
   (e) means for urging the granular material through the valve and into the pressurized fluid stream so that the introduced granular material flows through and from the housing in the pressurized fluid stream, the rate of introduction of granular material varying with the extent of opening of the valve;
   (f) a diaphragm within the housing;
   (g) linkage means associated with the diaphragm and valve so that varying the position of the diaphragm varies the extent of openings of the valve; and
   (h) means for resiliently urging the diaphragm in a valve-closing direction, the diaphragm being adapted within the housing to be moved under the fluid pressure therein against the resilient urging means to thereby move the valve to an open position, the extent of valve opening thereby being determined by the amount of fluid pressure therein.

3. Apparatus according to claim 2 wherein means are included for selectively holding the valve in a closed position when the diaphragm is subjected to fluid pressure.

4. Apparatus according to claim 2 wherein is included a second resilient urging means adapted to bias the diaphragm in a valve-closing position, and wherein the position of the first resilient urging means is adjustable relative to the diaphragm, the first resilient urging means being adapated to urge the diaphragm in a valve-closing direction only when the diaphragm has travelled a selected distance against the second resilient urging means, that distance being determined by the position of the first resilient urging means relative to the diaphragm.

5. Apparatus according to claim 4 wherein the valve comprises a valving element which is moved by the linkage means relative to an aperture, the aperture being shaped to present a continuously increasing aperture width to act in conjunction with the valving element as the valving element is moved in a valve-opening direction.

6. Apparatus according to claim 5 wherein the first and second resilient urging means are helical springs.

7. Apparatus according to claim 6 wherein is included a pressurized reservoir for holding the granular material and wherein the granular material is urged through the valve and into the pressurized fluid stream by its own weight.

8. Apparatus according to claim 7 wherein is included removable means on the housing adjacent the valve for allowing direct access to the valve to aid in the cleaning of granular material from the valve.

9. Apparatus according to claim 8 wherein the means for selectively holding the valve in a closed position when the diaphragm is subjected to fluid pressure comprises a rod extending from the housing and associated with the diaphragm to move therewith, and pivotal means outside of and associated with the housing for selectively limiting the travel of the rod to, in turn, limit the travel of the diaphragm under fluid pressure, whereby the valve may be made to remain in a closed position when the diaphragm is subjected to fluid pressure.

References Cited

UNITED STATES PATENTS

| 1,636,331 | 7/1927 | Smith | 222—193 |
| 3,257,045 | 6/1966 | Carpentier | 222—450 |

FOREIGN PATENTS

| 505,040 | 8/1951 | Belgium. |

ROBERT B. REEVES, *Primary Examiner.*

HADD S. LANE, *Assistant Examiner.*

U.S. Cl. X.R.

222—193